US005184645A

United States Patent [19]

Boerschig

[11] Patent Number: 5,184,645

[45] Date of Patent: Feb. 9, 1993

[54] SHEAR ORIFICE VALVE

[75] Inventor: Timothy J. Boerschig, Amherst, N.Y.

[73] Assignee: HSC Controls Inc., Buffalo, N.Y.

[21] Appl. No.: 793,812

[22] Filed: Nov. 18, 1991

[51] Int. Cl.[5] .......... F16K 11/074

[52] U.S. Cl. .......... 137/625.65; 137/625.25

[58] Field of Search .......... 137/625.65, 625.2, 625.33, 137/625.25

[56] References Cited

U.S. PATENT DOCUMENTS

| | | | |
|---|---|---|---|
| 3,221,760 | 12/1965 | Buchanan | 137/82 |
| 3,223,103 | 12/1965 | Trickler | 137/83 |
| 3,362,423 | 1/1968 | Swinehart | 137/83 |
| 3,489,179 | 1/1970 | McNeil et al. | 137/625.62 |
| 3,517,545 | 6/1970 | Ogren | 73/37.5 |
| 3,599,656 | 8/1971 | Pettis, Jr. | 137/83 |
| 3,621,864 | 11/1971 | Tonegawa | 137/83 |
| 3,712,339 | 1/1973 | Bartholomaus et al. | 137/625.62 |
| 3,746,044 | 7/1973 | Velicer et al. | 137/624.14 |
| 3,833,017 | 9/1974 | Gordon et al. | 137/625.62 |
| 3,866,620 | 2/1975 | Morton | 137/83 |
| 4,046,061 | 9/1977 | Stobes | 137/625.65 X |
| 4,362,182 | 12/1982 | Sjolund | 137/85 |
| 5,070,898 | 12/1991 | Jagodzinshi et al. | 137/82 |

*Primary Examiner*—John C. Fox
*Attorney, Agent, or Firm*—Joseph P. Gastel

[57] ABSTRACT

A shear orifice valve including a valve body, a torque motor mounted on the valve body, fluid inlet ducts in the valve body, a plurality of first opposed metering orifices in the valve body in communication with the first fluid duct, a plurality of second opposed metering orifices in the valve body in communication with the second fluid duct, an armature in the torque motor, a metering arm having first and second faces on opposite sides thereof coupled to the armature with the first and second faces located between the first and second opposed metering orifices, and a third fluid duct in the valve body for either receiving fluid simultaneously from the first orifices in response to movement of the metering arm in a first direction or for conducting fluid simultaneously to the second orifices in response to movement of the metering arm in a second direction.

9 Claims, 4 Drawing Sheets

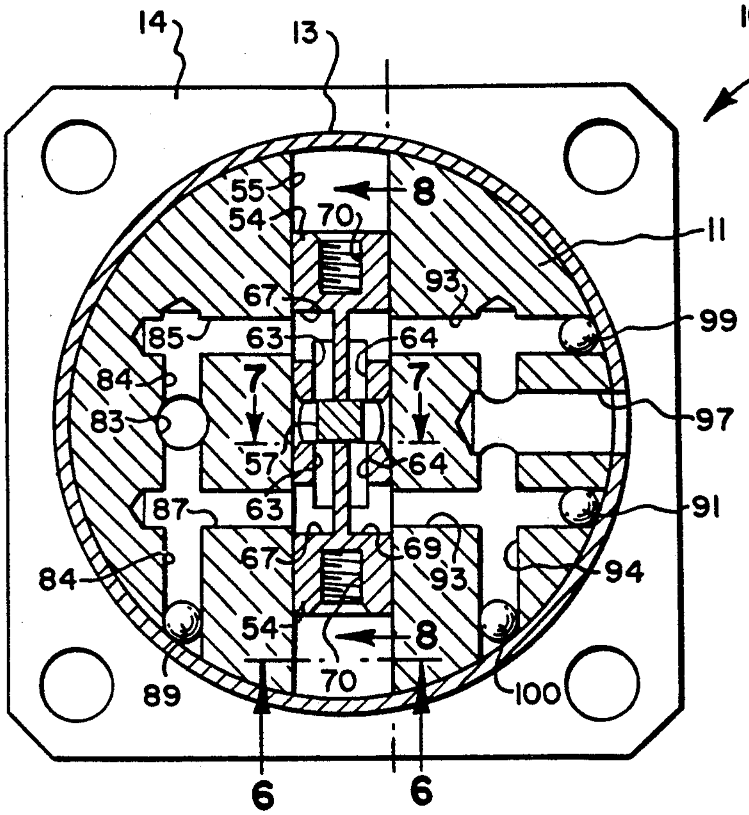
Fig. 5.
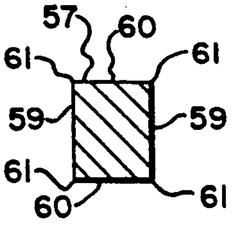
Fig. 9.
Fig. 6.
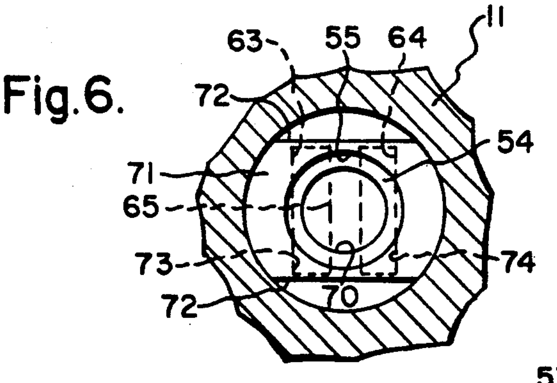
Fig. 7.
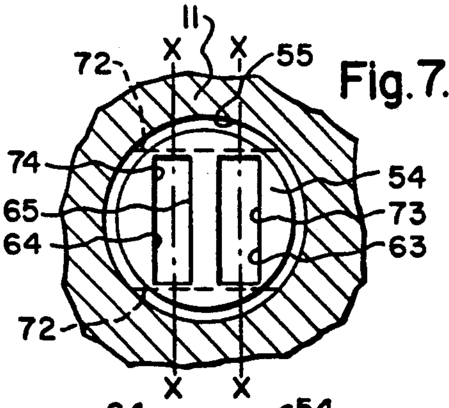
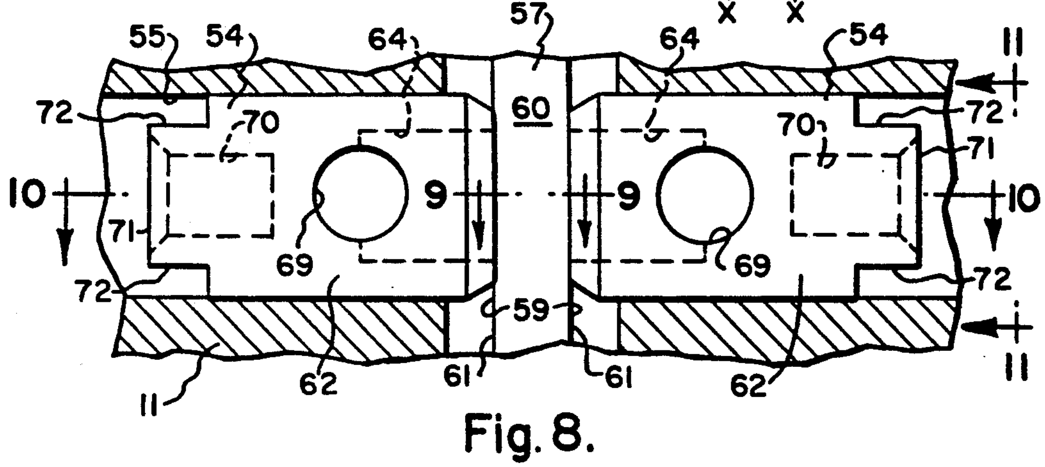
Fig. 8.

Fig. 10.
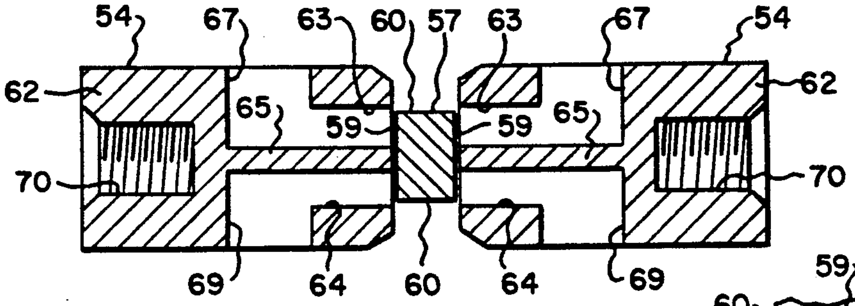
Fig. 11.
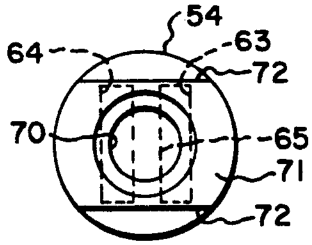
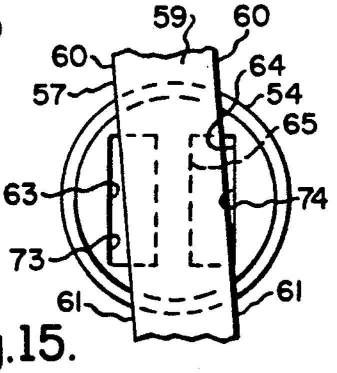
Fig. 15.
Fig. 16.
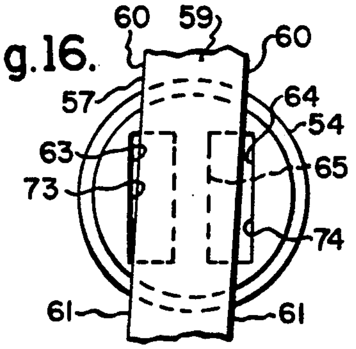
Fig. 12.
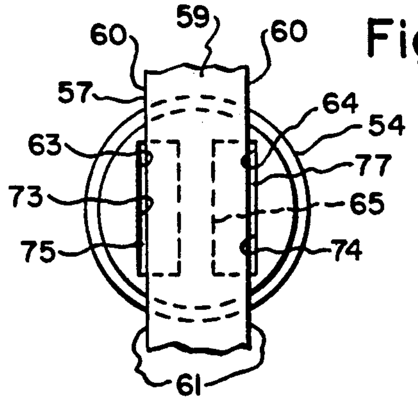
Fig. 13.
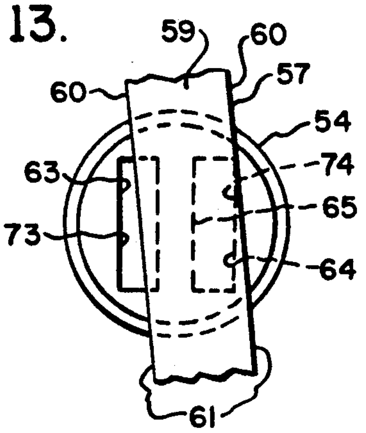
Fig. 14.
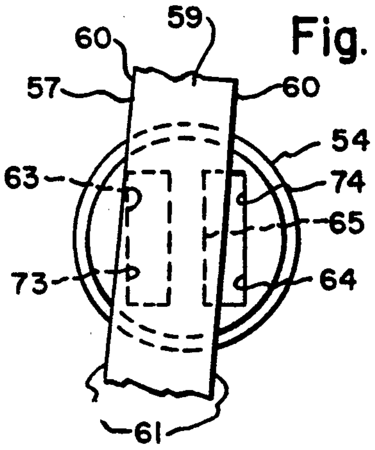

SHEAR ORIFICE VALVE

BACKGROUND OF THE INVENTION

The present invention relates to an improved torque motor-operated shear orifice valve.

By way of background, the valve of the present invention is an improvement over the shear orifice valve disclosed in copending U.S. patent application Ser. No. 653,708, filed Feb. 11, 1991. In the prior valve, flow of fluid can only be in one direction, either out through the valve or in through the valve, but not both. A valve of this type is known as a two-way valve and it was not capable of providing both flow out of the valve and flow into the valve in a particular application in which it was installed. In other words, it was not capable of providing what is known in the art as three-way operation.

SUMMARY OF THE INVENTION

It is the primary object of the present invention to provide an improved metering valve which is capable of three-way operation, that is, operation wherein the valve, when mounted in its operating environment, can cause fluid flow to go into it, out of it, or through it.

Another object of the present invention is to provide an improved shear orifice metering valve which includes unique metering orifices capable of providing three-way operation. A related object is to have the metering orifices of a configuration wherein they can be adjusted relative to a metering arm in an expedient and accurate manner. Other objects and attendant advantages will readily be perceived hereafter.

The present invention relates to a valve comprising a valve body, a torque motor mounted on said valve body, first and second fluid duct means in said valve body, a plurality of first opposed metering orifice means in said valve body in communication with said first fluid duct means, a plurality of second opposed metering orifice means in said valve body in communication with said second fluid duct means, an armature in said torque motor, a metering arm having first and second faces on opposite sides thereof coupled to said armature with said first and second faces located between said first opposed metering orifices and between said second opposed metering orifices, and third fluid duct means in said valve body for either receiving fluid simultaneously from said first orifice means in response to movement of said metering arm in a first direction or for conducting fluid simultaneously to said second orifice means in response to movement of said metering arm in a second direction.

The various aspects of the present invention will be more fully understood when the following portions of the specification are read in conjunction with the accompanying drawings wherein:

BRIEF DESCRIPTION OF THE DRAWINGS

FIG. 5 is a cross sectional view taken substantially along line 5—5 of FIG. 1;

FIG. 6 is an enlarged fragmentary cross sectional view taken substantially along line 6—6 of FIG. 5;

FIG. 7 is an enlarged fragmentary cross sectional view taken substantially along line 7—7 of FIG. 5;

FIG. 8 is an enlarged fragmentary cross sectional view taken substantially along line 8—8 of FIG. 5;

FIG. 9 is a cross sectional view of the metering arm taken substantially along line 9—9 of FIG. 8;

FIG. 10 is a fragmentary cross sectional view taken substantially along line 10—10 of FIG. 8;

FIG. 11 is an end view of a metering orifice member taken substantially in the direction of arrows 11 of FIG. 8;

FIG. 12 is an enlarged fragmentary view showing the metering arm in a neutral position relative to the orifices of a metering orifice member;

FIG. 13 is an enlarged fragmentary view of the metering arm moved in a counterclockwise direction from its position of FIG. 12 so as to completely close the outlet orifice;

FIG. 14 is an enlarged fragmentary view of the metering arm moved in a clockwise direction from its position of FIG. 12 so as to completely close the inlet orifice;

FIG. 15 is an enlarged fragmentary view of the metering arm in a position wherein the inlet orifice is more open than the outlet orifice; and FIG. 16 is an enlarged fragmentary view of the metering arm in a position wherein the outlet orifice is more open than the inlet orifice.

DESCRIPTION OF THE PREFERRED EMBODIMENTS

Figure 1:
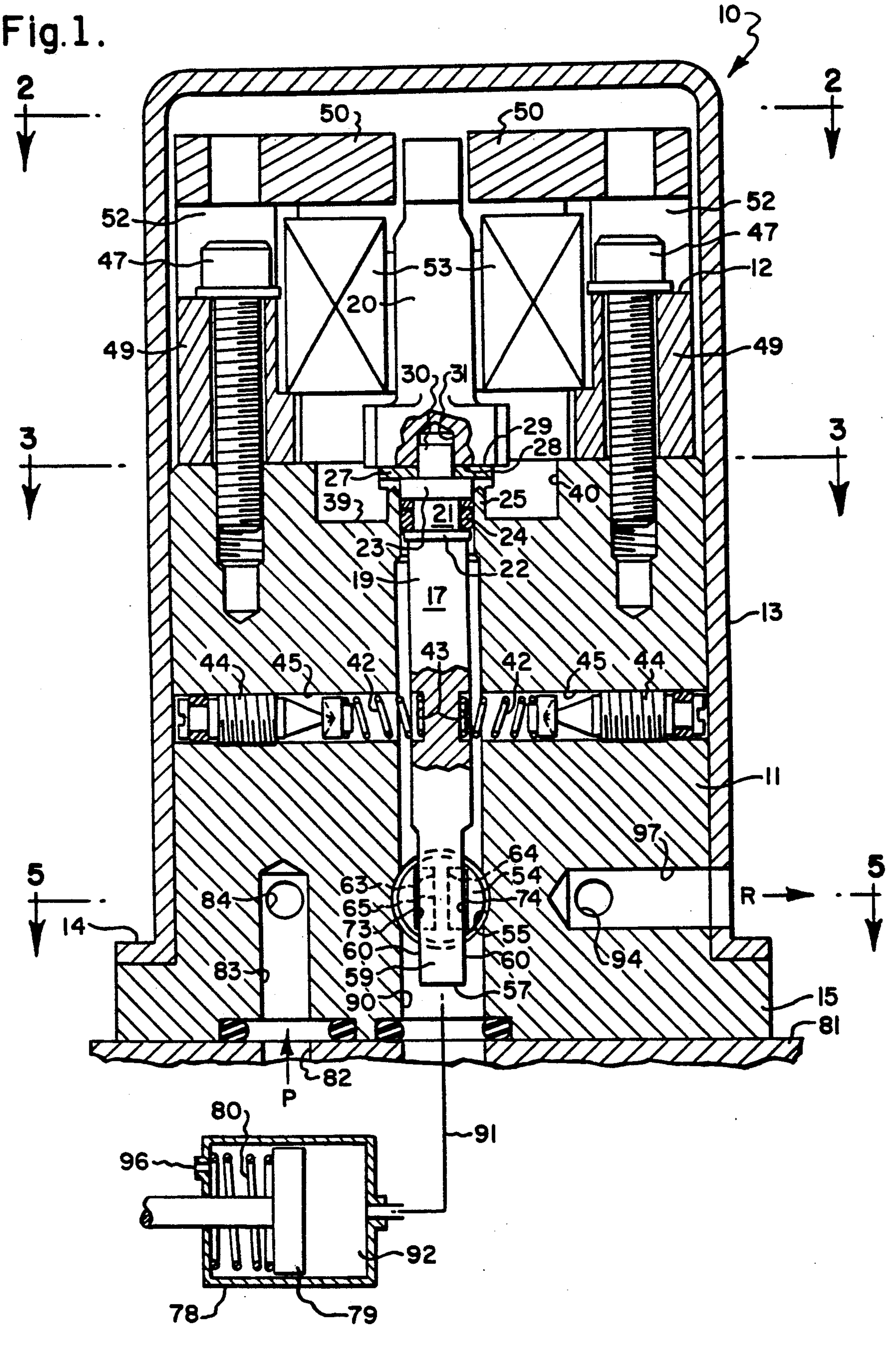
FIG. 1 is a fragmentary cross sectional view taken substantially along line 1—1 of FIG. 3.

The improved shear orifice valve 10 is a three-way valve which includes a valve body 11 having a torque motor 12 mounted thereon with both of them being contained within cover 13 having a flange 14 which overlies base 15 of the valve body.

Figure 4:
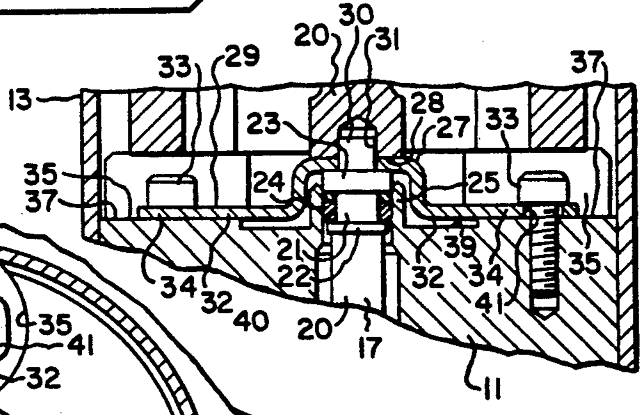
FIG. 4 is a fragmentary cross sectional view taken substantially along line 4—4 of FIG. 3.

A combined metering arm and armature 17, which consists of a metering arm 19 and an armature 20 is mounted on valve body 11. More specifically, the combined member 17 includes a neck 21 (FIG. 4) which is located between flanges 22 and 23 and on which an O-ring 24 is mounted, with the neck 22 being located within tubular extension 25 of valve body 11. O-ring 24 provides a seal between neck 21 and tubular extension 25.

Figure 3:
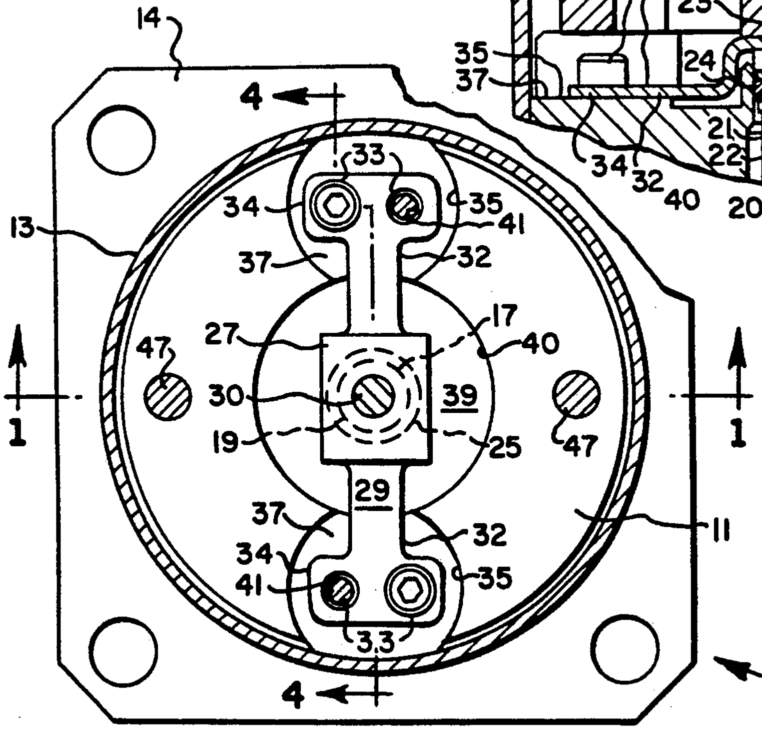
FIG. 3 is a fragmentary cross sectional view taken substantially along line 3—3 of FIG. 1.

The central portion 27 of a spring 29 is clamped between the underside 28 of armature 20 and collar 23 of metering arm 17, with the tip 30 of the metering arm being received within bore 31 of the armature. The outer ends 32 of the spring 29 are secured to valve body 11 by screws 33. The extreme outer parts 34 of portions 32 are located in circular depressions 35 (FIGS. 3 and 4), the bottoms 37 of which are at a higher elevation than the bottom 39 of circular depression 40. The holes 41 in armature spring end portions 34 through which the shanks 33 of the screws pass are oversized so as to permit a lattitude of adjustment of spring 29 on valve body 11. The metering arm portion 19 is centered by springs 42 (FIG. 1) having ends which are received in depressions 43 in the metering arm and which bear on opposite sides of metering arm 19. The force with which springs 42 exert is adjusted by screw members 44 which are located in bores 45.

The armature 20 is a part of torque motor 12 which is attached to valve body 11 by screws 47 which bear on frame members 49. Pole pieces 50 are secured to frame members 49 by screws 51. Magnets 52 are brazed to frame members 49. A coil 53 is suitably retained in the position shown in FIGS. 1 and 2. The electrical leads for coil 53 are omitted.

Metering orifice members 54 are located in bore 55 with a interference fit and they are positioned on opposite sides of metering arm portion 57 which has flat faces 59 intersected by flat faces 60 to produce sharp metering edges 61 (FIG. 9). Each of the metering orifice members 54 includes a body 62 having two rectangular orifices 63 and 64 therein which are separated by a partition 65. Bores 67 communicate with orifices 63, and bores 69 communicate with orifices 64. Orifices 63 are fluid inlet orifices and orifices 64 are fluid outlet orifices.

Metering orifice members 54 are installed in bore 55 with a interference fit, as noted above. In order to install them they are moved into bore 55 on opposite sides of metering arm portion 57 until they make the proper clearance therewith. In this regard each of the metering orifice members 54 has a tapped bore 70 therein which receives a suitable threaded tool for pushing or pulling each member 54. Also each member 54 has a flat boss 71 (FIGS. 8 and 11) having opposite parallel sides 72. The sides 72 extend perpendicularly to the longitudinal axes X-X (FIG. 7) of orifices 63 and 64. Thus by rotating each boss 71 to the proper attitude with a wrench (not shown) which fits across boss 71, the orientation of rectangular orifices 63 and 64 becomes known, and thus the bosses are used to index the metering orifice members 54 relative to metering arm portion 57. This is important because for a proper operation the corner edges 61 of metering arm portion 57 must bear a predetermined relationship to the outer edges 73 and 74 of rectangular orifices 63 and 64, respectively. In this regard, in certain applications, when the metering arm portion 57 is centrally located (FIG. 12), there should be a space 75 between metering arm edges 61 and metering orifice edges 73 and a space 77 between the opposite metering arm edges 61 and metering orifice edges 74 so that there can be a slight bleed between the metering arm portion 57 and each of the rectangular openings in each of the metering orifice members 54. This is shown in enlarged detail in FIG. 12 and in smaller detail without numerals in FIG. 5.

At this point it is noted that valve 10 is a three-way valve because there can be (1) flow of fluid into conduit 90 (FIG. 1) of the valve through inlet orifices 63, or there can be (2) flow out of conduit 90 through outlet orifices 64, or there can be (3) flow past metering arm portion 57 and out of the valve through conduits 93 when the metering arm is in its central position and there is the aforementioned bleed between metering arm portion 57 and orifices 63 and 64. However, if desired, the metering arm and orifices can be dimensioned so that the metering arm blocks all the orifices when it is in a central position.

When metering arm portion 57 swings counterclockwise from the central position of FIG. 12 to the position of FIG. 13, orifices 63 in each metering orifice member 54 will be opened more and orifices 64 will be closed. The converse is shown in FIG. 14 when metering arm portion 57 moves in a clockwise direction from its position in FIG. 12.

Figure 2:
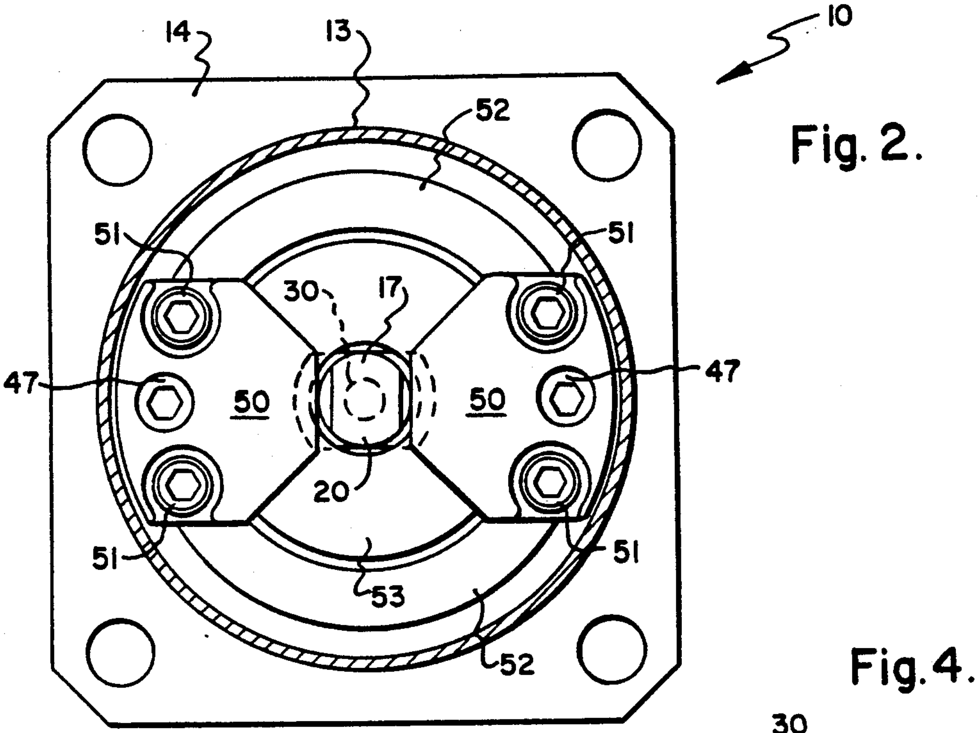
FIG. 2 is a cross sectional view taken substantially along line 2—2 of FIG. 1.

The servovalve 10 of the present invention is shown in FIG. 1 as performing a pressure control function in conjunction with a cylinder 78 having a piston 79 therein which is biased to the right by a spring 80. Valve 10 is mounted on a base 81 which has a pressure port 82 therein in communication with conduit 83 in valve body 11 (FIGS. 1 and 5). Conduit 83 in turn is in communication with conduit 84 which in turn is in communication with conduits 85 and 87. Conduit 84 is blocked at its end by a ball 89. Thus, the source of pressure P is in communication with bore 67 of one of the metering orifice members 54 via conduits 83, 84 and 85 and is in communication with the orifice 67 of the other metering orifice member 54 via conduits 83, 84 and 87. Thus the pressure is applied to orifices 63 of each of the metering orifice members, and the fluid pressure is exerted on the opposite faces 59 of metering arm portion 57. Thus there is no tendency for the metering arm to be forced away from the metering orifices by fluid pressure as would be the case if the orifice was only on one side of the metering arm.

When it is desired to move piston 79 to the left in FIG. 1, the torque motor 12 is actuated to cause the metering arm portion 57 to move to the position of FIG. 13 to thus place conduit 90 in valve body 11 in greater communication with orifices 63 to thereby apply pressurized fluid through conduit 91 to chamber 92 of cylinder 78. Piston 79 will then move to the left from the central position of FIG. 1 as far as it can against the bias of spring 80. A vent 96 is in the portion of cylinder 78 where spring 80 is located.

When it is desired to cause piston 79 to move to the right, the torque motor 12 is actuated to cause the metering arm portion 57 to move to the position of FIG. 14 whereupon inlet orifices 63 in each of members 54 are blocked and outlet orifices 64 are opened more. This will place conduit 90 in communication with orifices 64 which lead to outlet orifices 69 (FIGS. 5 and 10) of each of the metering orifice members 54, and the latter are in communication with conduits 93 in valve body 11 which in turn are in communication with conduit 94 which is in communication with return conduit 97 leading to the atmosphere designated by R when the medium is compressed air. The spring 80 will then move piston 90 to its rightmost position from its central position of FIG. 1. However, if the medium is a liquid, conduit 97 may be attached to a conduit leading to a sump. Balls 91, 99 and 100 are wedged into conduits 93, 93 and 94, respectively, to close them.

In the above-described mode of operation the flow of fluid is either into valve conduit 90 from inlet orifices 63 or the flow is out of conduit 90 through outlet orifices 64. Also when the metering arm portion 57 is positioned and dimensioned as shown in FIG. 12, there will be a bleeding of fluid from orifices 63 into conduit 90 and simultaneously a bleeding of fluid from conduit 90 into orifices 64. It is the foregoing action which is known as three-way operation.

When the metering arm portion 57 is in the central position of FIG. 12, piston 79 will be in an intermediate position between its leftmost and rightmost positions. This is because of the bleeding described in the immediately preceding paragraph whereby only a fraction of the inlet pressure at P is applied to piston 79. The exact position of piston 79 will be determined by the amount of bleeding.

If the bleeding is eliminated so that the metering arm portion 57 completely blocks orifices 63 and 64, as noted briefly above, the piston 79 can be moved to various intermediate positions by uncovering orifices 63 or 64 and then closing them when the piston 79 has reached the desired position.

In addition to the foregoing, the metering arm portion 57 can be positioned relative to orifices 63 and 64 as shown in FIGS. 15 and 16 wherein they are covered different amounts to cause piston 79 to assume positions between the central position of FIG. 1 and the above discussed extreme positions corresponding to FIGS. 13 and 14. More specifically, when the metering arm portion is in the position of FIG. 15, inlet orifices 63 are opened more than outlet orifices 64, and therefore piston 79 will assume a position between its central position of FIG. 1 and its leftmost position, which was discussed above relative to FIG. 13. When the metering arm portion is in the position of FIG. 16, outlet orifices 64 are opened more than inlet orifices 63, and therefore piston 79 will assume a position between its central position of FIG. 1 and its rightmost position, which was discussed above relative to FIG. 14. Thus piston 79 can be moved to any desired position between its extreme rightmost and leftmost positions in response to the positioning of metering arm portion 57.

As is well understood, the above described positioning of the metering arm is effected by varying the current applied to the torque motor.

It can thus be seen that the shear orifice valve of the present invention is manifestly capable of achieving the above-enumerated objects and while preferred embodiments of the present invention have been disclosed, it will be appreciated that it is not limited thereto but may be otherwise embodied within the scope of the following claims.

What is claimed is:

1. A valve comprising a valve body, a torque motor mounted on said valve body, first and second fluid duct means in said valve body, a plurality of first opposed metering orifice means in said valve body in communication with said first fluid duct means, a plurality of second opposed metering orifice means in said valve body in communication with said second fluid duct means, an armature in said torque motor, a metering arm having first and second faces on opposite sides thereof coupled to said armature with said first and second faces located between said first opposed metering orifices and between said second opposed metering orifices, and third fluid duct means in said valve body for either receiving fluid simultaneously from said first orifice means in response to movement of said metering arm in a first direction or for conducting fluid simultaneously to said second orifice means in response to movement of said metering arm in a second direction.

2. A valve as set forth in claim 1 wherein one of said first orifice means and one of said second orifice means are located in a first orifice member, and wherein another of said first orifice means and another of said second orifice means are located in a second orifice member, and wherein said first and second orifice members are located on opposite sides of said metering arm in fourth fluid duct means which extend transversely to said third fluid duct means.

3. A valve as set forth in claim 2 wherein said first and second orifice members are contained in said fourth duct means with a friction fit.

4. A valve as set forth in claim 3 including means for both rotating and axially moving said first and second orifice members in said fourth duct means to adjust the positions thereof.

5. A valve as set forth in claim 2 including means for indexing at least one of said first and second orifice members relative to said fourth duct means.

6. A valve as set forth in claim 2 wherein said first and second orifice means include axes, and indexing means on said first and second orifice means oriented in a specific manner with respect to said axes.

7. A valve as set forth in claim 6 including means for both rotating and axially moving said first and second orifice members in said fourth duct means to adjust the positions thereof.

8. A valve as set forth in claim 1 wherein said metering orifices have edge portions, and wherein said first and second faces on opposite sides of said metering arm are parallel to each other and are intersected by third and fourth parallel faces on opposite sides of said metering arm so as to form first and second pairs of metering edges on said first and second faces, respectively, for metering flow from said first and second metering orifices.

9. A valve as set forth in claim 8 including clearances between said edge portions and said first and second pairs of metering edges.

* * * * *